United States Patent
Schramm et al.

(10) Patent No.: US 11,461,479 B2
(45) Date of Patent: Oct. 4, 2022

(54) COMPUTING DEVICE AND METHOD FOR OPERATING SAME

(71) Applicant: Robert Bosch GmbH, Stuttgart (DE)

(72) Inventors: Juergen Schramm, Bietigheim-Bissingen (DE); Alexander Meurer, Bochum (DE); Ramona Jung, Stuttgart (DE); Christoph Lenz, Backnang (DE); Andreas Weber, Weissach (DE); Florian Ziegler, Stuttgart (DE); Frederic Stumpf, Leonberg (DE); Ilias Sagar, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/054,681

(22) PCT Filed: May 22, 2019

(86) PCT No.: PCT/EP2019/063188
§ 371 (c)(1),
(2) Date: Nov. 11, 2020

(87) PCT Pub. No.: WO2019/242971
PCT Pub. Date: Dec. 26, 2019

(65) Prior Publication Data
US 2021/0073397 A1     Mar. 11, 2021

(30) Foreign Application Priority Data

Jun. 20, 2018   (DE) .......................... 102018209965.0
Jul. 13, 2018   (DE) .......................... 102018211752.7
Aug. 13, 2018   (DE) .......................... 102018213617.3

(51) Int. Cl.
*G06F 21/60*     (2013.01)
*G06F 12/14*     (2006.01)
(Continued)

(52) U.S. Cl.
CPC .......... *G06F 21/602* (2013.01); *G06F 9/4401* (2013.01); *G06F 12/1408* (2013.01);
(Continued)

(58) Field of Classification Search
CPC .. G06F 21/602; G06F 9/4401; G06F 12/1408; G06F 21/51; G06F 21/567;
(Continued)

(56) References Cited

U.S. PATENT DOCUMENTS 9,894,081 B2 *    2/2018   Wagner ............... H04L 63/1466
10,909,006 B2 *   2/2021   Ainsworth .......... G06F 11/1407
(Continued)

OTHER PUBLICATIONS

Machine translation of Chinese patent application No. CN 110520861 A1, filed on Apr. 13, 2018, published on Nov. 29, 2019, B J Farrell. (Year: 2019).*
(Continued)

*Primary Examiner* — Shanto Abedin
(74) *Attorney, Agent, or Firm* — Norton Rose Fulbright US LLP; Gerard Messina

(57) ABSTRACT

A computing device that includes at least one processor core for executing a first computer program, the computing device being designed to access a memory device, in particular in order to load the first computer program. The computing device is designed to transmit a first control command, which characterizes the first computer program and/or a memory area of the memory device associated with the first computer program, to at least one cryptography module. The cryptography module is designed in particular to check the computer program, or the memory area of the memory device associated with the first computer program, characterized by the first control command, and the computing device is designed to execute the first computer program.

7 Claims, 3 Drawing Sheets

(51) Int. Cl.
*G06F 21/57* (2013.01)
*G06F 21/64* (2013.01)
*G06F 21/79* (2013.01)
*H04L 9/32* (2006.01)
*G06F 9/4401* (2018.01)
*G06F 21/51* (2013.01)
*G06F 21/56* (2013.01)

(52) U.S. Cl.
CPC ............ *G06F 21/51* (2013.01); *G06F 21/567* (2013.01); *G06F 21/57* (2013.01); *G06F 21/575* (2013.01); *G06F 21/64* (2013.01); *G06F 21/79* (2013.01); *H04L 9/3242* (2013.01); *G06F 2212/1052* (2013.01); *G06F 2221/03* (2013.01)

(58) Field of Classification Search
CPC ........ G06F 21/57; G06F 21/575; G06F 21/64; G06F 21/79; H04L 9/3242
See application file for complete search history.

(56) References Cited

U.S. PATENT DOCUMENTS

| | | | | |
|---|---|---|---|---|
| 2005/0193217 | A1* | 9/2005 | Case | G06F 21/57 726/22 |
| 2006/0036853 | A1* | 2/2006 | Chen | G06F 21/64 713/161 |
| 2008/0141042 | A1* | 6/2008 | Lo | G06F 21/6281 713/193 |
| 2009/0113210 | A1* | 4/2009 | Westerinen | G06F 21/51 713/187 |
| 2009/0327678 | A1* | 12/2009 | Dutton | G06F 21/575 713/2 |
| 2011/0264963 | A1* | 10/2011 | Pletinckx | G06F 11/0703 714/42 |
| 2013/0117578 | A1* | 5/2013 | Ihle | H04L 9/32 713/193 |
| 2013/0124845 | A1* | 5/2013 | Wang | G06F 21/554 713/2 |
| 2016/0232379 | A1* | 8/2016 | Edwards | G06F 21/566 |
| 2016/0241404 | A1* | 8/2016 | Shokrollahi | H04L 63/12 |
| 2016/0259584 | A1* | 9/2016 | Schlottmann | G06F 21/44 |
| 2017/0244704 | A1* | 8/2017 | Brickell | H04L 9/3242 |
| 2018/0150637 | A1* | 5/2018 | Filimon | G06F 21/575 |
| 2018/0309578 | A1* | 10/2018 | Farrell | G06F 21/44 |
| 2019/0229913 | A1* | 7/2019 | Fava | H04L 9/32 |
| 2019/0250900 | A1* | 8/2019 | Troia | H04W 12/35 |
| 2019/0305962 | A1* | 10/2019 | Takemori | H04L 9/3234 |

OTHER PUBLICATIONS

Machine translation of Korean patent application No. KR 20160136386 A, published on Nov. 29, 2016, Nerot Sebastien (Year: 2016).*
Fardin Abdi et al., On-Chip Control Flow Integrity Check for Real Time Embedded Systems, IEEE (Year: 2013).*
Morris Dworkin, "Recommendation for Block Cipher Modes of Operation: The CMAC Mode for Authentication", NIST Special Publication 800-38B. May 2005, Retrieved from the Internet on Nov. 10, 2020: https://doi.org/10.6028%2Fnist.sp.800-38b, 21 Pages.
Nternational Search Report for PCT/EP2019/063188, dated Jul. 19, 2019.

* cited by examiner

COMPUTING DEVICE AND METHOD FOR OPERATING SAME

FIELD

The present invention relates to a computing device that includes at least one processor core for executing a first computer program, the computing device being designed to access a memory device, in particular in order to load the first computer program. These types of computing devices are used, for example, in control units for motor vehicles, for example in the form of so-called embedded systems.

Moreover, the present invention relates to a method for operating such a computing device.

SUMMARY

An object of the present invention is to provide a computing device that has increased reliability and increased functional value.

This object may be achieved in that, in accordance with an example embodiment of the present invention, the computing device is designed to transmit a first control command, which characterizes the first computer program and/or a memory area of the memory device associated with the first computer program, to at least one cryptography module, the cryptography module being designed in particular to check the computer program, or the memory area of the memory device associated with the first computer program, characterized by the first control command, and the computing device being designed to execute the first computer program. This advantageously allows a check of the first computer program to be initiated by the cryptography module. The option is thus advantageously provided to check the first computer program, or a content of the memory area in which the first computer program is stored, for example for deviations from a predefinable content. It is thus advantageously possible, for example, for the computing device to prevent the execution of computer programs that are unsecure or compromised by an attacker. It is also advantageous that the memory area to be checked or the memory areas to be checked (for example, address information, which memory blocks are to be checked) may be signaled to the cryptography module with the aid of the first control command, so that these pieces of information do not have to be preconfigured, for example. Instead, the memory area to be checked or the memory areas to be checked or computer programs may be signaled dynamically (for example, during runtime of the cryptography module or the computing device) with the aid of the first control command, thus further increasing the flexibility.

In preferred specific embodiments of the present invention, the memory device may be situated or provided externally to the computing device (and in particular also externally to the cryptography module). However, in further preferred specific embodiments, the memory device may also be integrated into the computing device. In even further preferred specific embodiments, a system, in particular a system on a chip (SoC), may advantageously also be provided which includes the computing device according to the specific embodiments, the memory device, and the cryptography module according to the specific embodiments.

In further preferred specific embodiments of the present invention, the computing device is designed to receive a response of the cryptography module to the first control command, or to read out same from the cryptography module (for example, from a memory area of the cryptography module to which the computing device may make read access (preferably only read access, not write access)), in particular the response including information concerning the result of a check of the computer program or of the memory area of the memory device associated with the first computer program, characterized by the control command.

In further preferred specific embodiments of the present invention, it is provided that the cryptography module is designed to carry out the check of the first computer program or of the at least one memory area using a cipher-based message authentication code (CMAC). A particularly efficient check is thus made possible. An Internet publication that deals with an example of a design of the CMAC method is available at https://doi.org/10.6028%2Fnist.sp.800-38b, for example. A result of the check may be written into a or the memory area of the cryptography module to which the computing device may make read access (preferably only read access, not write access). Thus, in further preferred specific embodiments of the present invention, the computing device may read out the result of the check from this memory area of the cryptography module.

In further preferred specific embodiments of the present invention, it is provided that the cryptography module includes a memory unit, preferably integrated into the cryptography module, for storing at least one reference value and/or a reference layout for the at least one memory area. In further preferred specific embodiments, the reference value may represent, for example, a CMAC value for a predefinable memory content that may be compared, for example, to a CMAC value that has been ascertained by the cryptography module when checking the at least one first computer program or memory area. If the ascertained CMAC value differs from the reference value, an inadmissible change in the memory content of the checked memory area and in particular of the computer program stored therein may be deduced.

In further preferred specific embodiments of the present invention, it is provided that the cryptography module is designed to carry out the check as a function of the reference value. In these specific embodiments, the check includes, for example, the formation of a CMAC value as a function of the first computer program or of the memory content of the at least one memory area, and a comparison of the CMAC value thus formed to the reference value, which is stored, for example, in the memory unit of the cryptography module. Alternatively or additionally, in further preferred specific embodiments of the present invention, the reference value may also be transmitted to the cryptography module by the computing device with the aid of the first control command. Also alternatively or additionally, in further specific embodiments it is also possible with the aid of the first control command to transmit to the cryptography module multiple reference values for multiple computer programs or memory areas to be checked.

In further preferred specific embodiments of the present invention, the reference layout may contain one or multiple of the following pieces of information: a) the number of computer programs or memory areas in the memory device which the computing device may access, b) an address area (start address and/or end address) of the computer programs or memory areas in question, c) the length of the computer programs or memory areas in question, d) at least one reference value (a CMAC value, for example) of the computer program or memory area in question, e) data concerning a cryptographic signature, for example a signature address and/or a signature type and/or a reference to a higher-order certificate ("root certificate"). The information may preferably be stored in a data structure that includes multiple corresponding data fields.

In further preferred specific embodiments of the present invention, the cryptography module may utilize the above-mentioned reference values or the reference layout in order to establish the type and the extent of a check of at least one computer program or memory area. For example, the quantity of input data for the check (CMAC value formation, for example) may be established based on a start address and an end address.

In further preferred specific embodiments of the present invention, it is provided that the computing device is designed to execute the first computer program directly after transmitting the first control command to the cryptography module, in particular without waiting for a or the response of the cryptography module to the first control command and/or without reading out the response from the cryptography module. In these specific embodiments, the first computer program is thus already executed by the computing device, even before a check of the first computer program by the cryptography module has concluded or the result of the check of the first computer program by the cryptography module is read out by the computing device (for example, in the form of the response to the first control command). A particularly quick execution of the first computer program by the computing device is thus ensured, and at the same time, the check of the first computer program by the cryptography module has at least been initiated with the aid of the first control command.

In further preferred specific embodiments of the present invention, it is provided that the computing device is designed to wait for a or the response of the cryptography module to the first control command and/or to read out the response from the cryptography module, and to execute the first computer program only after the response is received or read out. A particularly reliable execution of the first computer program, which takes place only after the check by the cryptography module, is thus made possible.

In further preferred specific embodiments of the present invention, it is provided that the computing device is designed to control an operation of the computing device as a function of the response. Thus, for example, in the event of a negative result of the check of the first computer program by the cryptography module (the first computer program has been changed, for example due to an error in the memory device, or manipulated), an error response may be initiated by the computing device and/or by the cryptography module. The error response may provide at least one of the following measures, for example: abortion of the execution of the first computer program by the computing device (if possible), prevention of a repeated or new execution of the first computer program by the computing device, signaling of an error state to an external unit, resetting the computing device, temporary or permanent deactivation of the computing device, deletion of the first computer program from the memory device.

In further preferred specific embodiments of the present invention, it is provided that a) the memory device is integrated into the computing device, and/or b) the memory device is provided externally to the computing device.

Further preferred specific embodiments of the present invention relate to a method for operating a computing device that includes at least one processor core for executing a first computer program, the computing device being designed to access a memory device, in particular in order to load the first computer program, the computing device transmitting a first control command, which characterizes the first computer program and/or a memory area of the memory device associated with the first computer program, to at least one cryptography module, the cryptography module being designed to check the first computer program, or the memory area of the memory device associated with the first computer program, characterized by the first control command, and the computing device executing the first computer program.

In further preferred specific embodiments of the present invention, it is provided that the computing device receives a response of the cryptography module to the first control command or reads out same from the cryptography module, in particular the response including information concerning the result of a check of the computer program, or of the memory area of the memory device associated with the first computer program, characterized by the control command.

In further preferred specific embodiments of the present invention, it is provided that the computing device executes the first computer program directly after transmitting the first control command to the cryptography module, in particular without waiting for a or the response by the cryptography module to the first control command and/or without reading out the response from the cryptography module (in particular prior to the start of the first computer program).

Further preferred specific embodiments of the present invention relate to a cryptography module, in particular for at least one computing device according to the specific embodiments, the cryptography module being designed to receive from the computing device a first control command that characterizes a first computer program and/or a memory area of the memory device associated with the first computer program, the cryptography module being designed to check the computer program or the memory area of the memory device associated with the first computer program, characterized by the first control command. In further preferred specific embodiments, the check may take place as described above, using a CMAC method.

In further preferred specific embodiments of the present invention, it is provided that the cryptography module is designed to ascertain a response to the first control command, in particular the response including information concerning the result of a check of the computer program, or of the memory area of the memory device associated with the first computer program, characterized by the control command.

Further preferred specific embodiments of the present invention relate to a system that includes at least one computing device according to the specific embodiments, at least one memory device, and at least one cryptography module according to the specific embodiments, in particular the at least one computing device, the at least one memory device, and the at least one cryptography module being situated on the same semiconductor substrate, in particular in the form of an SoC.

Further advantageous specific embodiments of the present invention are described herein.

Further features, application options, and advantages of the present invention result from the following description of exemplary embodiments of the present invention illustrated in the figures. All described or illustrated features, alone or in any arbitrary combination, constitute the subject matter of the present invention, regardless of their wording or illustration in the description or figures, respectively.

DETAILED DESCRIPTION OF EXAMPLE EMBODIMENTS

Figure 1:
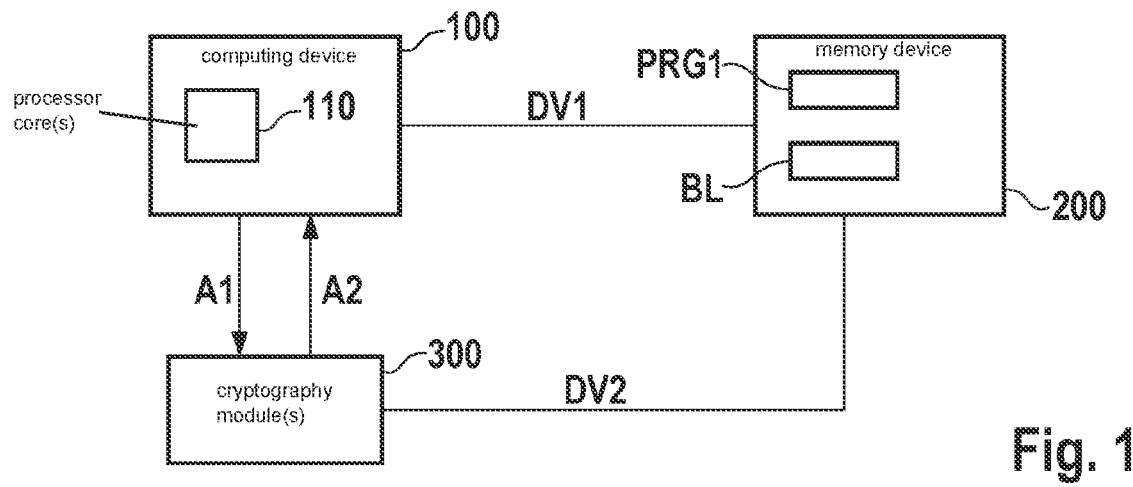
FIG. 1 schematically shows a simplified block diagram of a computing device according to one specific embodiment of the present invention.

FIG. 1 schematically shows a simplified block diagram of a computing device 100 according to one specific embodiment of the present invention. Computing device 100 includes at least one processor core 110 for executing a first computer program PRG1 which, for example, is stored at least temporarily in a memory device 200 and which computing device 100 may access. Memory device 200 includes, for example, a working memory (RAM) and/or a nonvolatile memory (flash EEPROM, for example).

In the present case, the access of computing device 100 to memory device 200 takes place with the aid of a first data link DV1, which may include at least one address bus and/or data bus, for example. In further specific embodiments, a bootloader BL for computing device 100 and optionally other computer programs (not shown) may likewise be stored in memory device 200.

Computing device 100 is designed to load and execute first computer program PRG1. Computing device 100 is also designed to transmit a first control command A1, which characterizes first computer program PRG1, and/or a memory area (for example, an address area in an address space of memory device 200) associated with first computer program PRG1, to at least one cryptography module 300. Cryptography module 300 is designed to check computer program PRG1, or the memory area of memory device 200 associated with first computer program PRG1, characterized by first control command A1. This advantageously allows a check of first computer program PRG1 to be initiated and carried out by cryptography module 300. The option is thus advantageously provided to check first computer program PRG1 or a content of the memory area in which first computer program PRG1 is stored, for example for deviations from a predefinable content. It is thus advantageously possible, for example, for computing device 100 to prevent the execution of computer programs that are unsecure or compromised by an attacker. It is also advantageous that the memory area to be checked or the memory areas to be checked (for example, address information, which memory blocks are to be checked) may be signaled to cryptography module 300 with the aid of first control command A1, so that these pieces of information do not have to be preconfigured, for example. Instead, the memory area to be checked or the memory areas to be checked or computer programs PRG1 may be signaled dynamically (for example, during runtime of cryptography module 300 or computing device 100) with the aid of first control command A1, thus further increasing the flexibility.

In further preferred specific embodiments, memory device 200 may be situated or provided externally to computing device 100 (and in particular also externally to cryptography module 300). Cryptography module 300 may access memory device 200 via, for example, a second data link DV2, which in further specific embodiments may also have a design that is identical or similar to first data link DV1.

Figure 2:
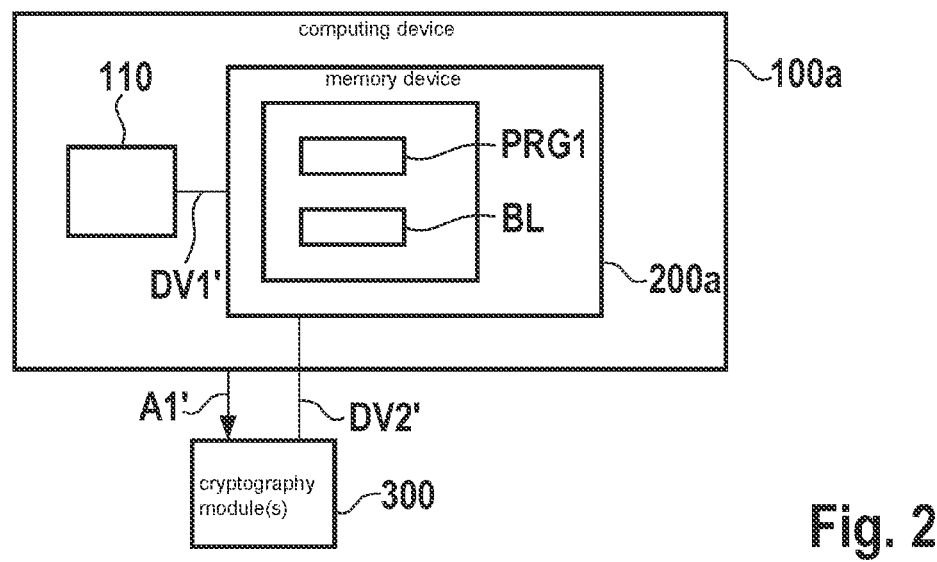
FIG. 2 schematically shows a simplified block diagram of a computing device according to a further specific embodiment of the present invention.

However, in further preferred specific embodiments (see configuration 100a according to FIG. 2), memory device 200a may also be integrated into computing device 100a. Processor core 110 may access memory device 200a via data link DV1', and cryptography module 300 may access memory device 200a via data link DV2'. A control command for initiating a check of first computer program PRG1 is denoted by reference symbol A1' in FIG. 2.

In even further preferred specific embodiments (see FIG. 3), a system 1000, in particular a system on a chip 1000 (SoC), which includes computing device 100, memory device 200, and cryptography module 300, may also advantageously be provided. All components 100, 200, 300 are preferably situated on same semiconductor substrate 1000a.

Figure 3:
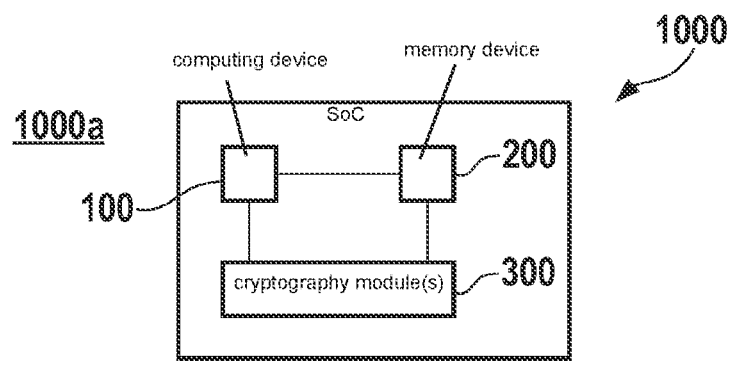
FIG. 3 schematically shows a simplified block diagram of a further specific embodiment of the present invention.
Figure 4:
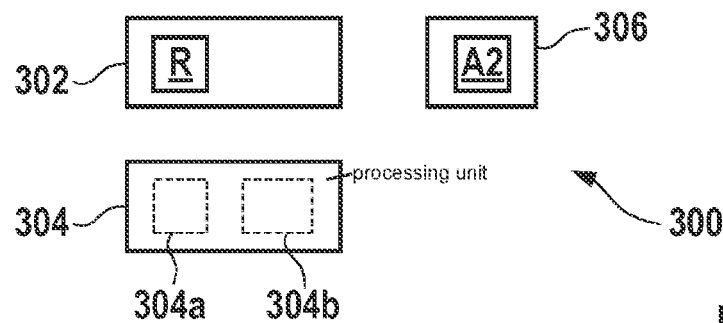
FIG. 4 schematically shows a simplified block diagram of a cryptography module according to one specific embodiment of the present invention.

FIG. 4 schematically shows a simplified block diagram of a cryptography module 300 according to one specific embodiment. Cryptography module 300 includes a memory unit 302 for storing at least one reference value R and/or a reference layout for computer programs PRG1 to be checked (FIG. 1), as well as a processing unit 304 that is designed to execute the stated check of computer program PRG1 and is preferably designed completely as a hardware circuit. Alternatively, processing unit 304 may also include a processor core 304a and a memory device 304b for operating software that controls an operation of cryptography module 300. In addition, cryptography module 300 includes a result memory unit 306 to which computing device 100 (FIGS. 1, 3), 100a (FIG. 2) may make read access, but not write access.

Figure 5:
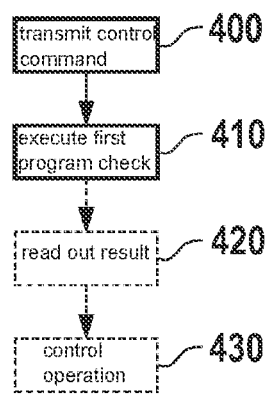
FIG. 5 schematically shows a simplified flowchart of a method according to one specific embodiment of the present invention.

FIG. 5 schematically shows a simplified flowchart of a method according to one specific embodiment. Computing device 100 (FIG. 1) transmits control command A1, which in the present case by way of example characterizes first computer program PRG1 or its memory area in memory device 200, to cryptography module 300 in step 400. Cryptography module 300 is thus informed concerning which computer program or which memory area of memory device 200 it is to check. Computing device 100 executes first computer program PRG1, in particular without waiting for the stated check, in step 410 (FIG. 5). Computing device 100 reads out in optional step 420 a response or a result A2 (FIG. 3) that cryptography module 300 has formed as a function of control command A1, for example directly from result memory unit 306 according to FIG. 4. Computing device 100 controls its operation in optional step 430 as a function of result A2. Response or result A2 may, for example, include information concerning the result of the check of computer program PRG1, or of the memory area of memory device 200 associated with first computer program PRG1, characterized by control command A1.

In further preferred specific embodiments, it is provided that cryptography module 300 is designed to carry out the check of first computer program PRG1 or of the at least one memory area using a cipher-based message authentication code (CMAC). A particularly efficient check is thus made possible. An Internet publication that deals with an example of a design of the CMAC method is available at https://doi.org/10.6028%2Fnist.sp.800-38b, for example. A result of the check may be written, for example, into result memory area 306 (FIG. 4) of cryptography module 300 to which computing device 100, 100*a* may make read access (preferably only read access, not write access). Thus, in further preferred specific embodiments, computing device 100, 100*a* may read out the result of the check from this memory area 306 of cryptography module 300. Alternatively or additionally, in further specific embodiments cryptography module 300 may also transmit response or result A2 to computing device 100, 100*a*.

Figure 6:
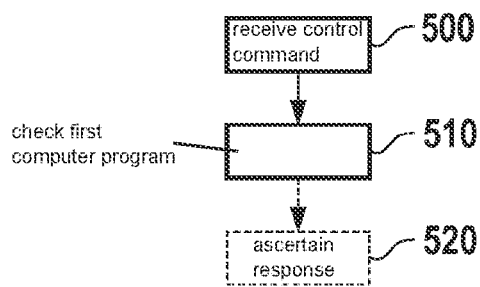
FIG. 6 schematically shows a simplified flowchart of a method according to a further specific embodiment of the present invention.

FIG. 6 schematically shows a simplified flowchart of a method for operating cryptography module 300 (FIG. 4) according to one specific embodiment. Cryptography module 300 receives first control command A1 from computing device 100, 100*a* in step 500 (FIG. 6). Cryptography module 300 checks first computer program PRG1 characterized by first control command A1, for example using a CMAC computation, in step 510. Cryptography module 300 ascertains a response A2 to first control command A1 in optional step 520, in particular response A2 including information concerning the result of check 510 of computer program PRG1 or of the memory area of memory device 200, 200*a* associated with first computer program PRG1, characterized by control command A1.

Figure 7:
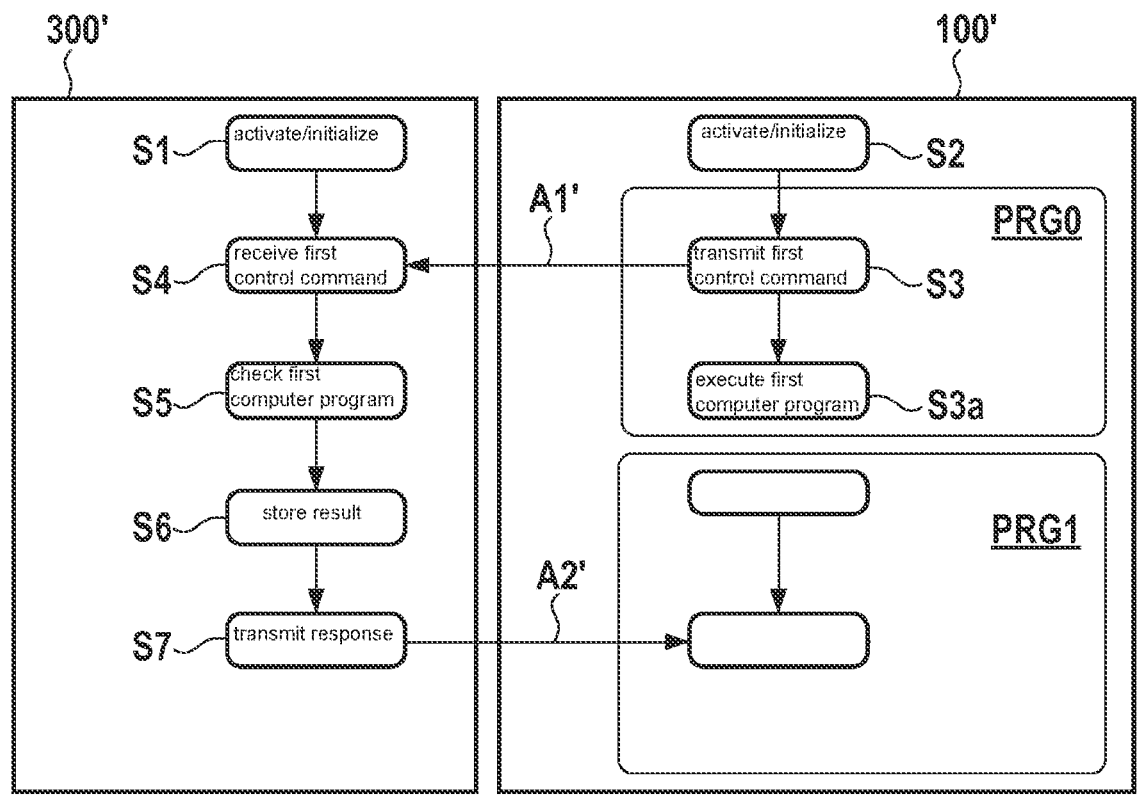
FIG. 7 schematically shows a simplified flowchart according to a further specific embodiment of the present invention.

FIG. 7 schematically shows a simplified block diagram of a further specific embodiment. Area 100' includes steps that are carried out essentially on the side of computing device 100, and area 300' includes steps that are carried out essentially on the side of cryptography module 300. Cryptography module 300 is activated or initialized in step S1. Computing device 100 is activated or initialized in step S2. In some specific embodiments, steps S1, S2 may preferably take place at least essentially simultaneously or offset in time.

After initialization S2, computing device 100 executes a start program PRG0 (for example, a bootloader BL (FIG. 1) or a program that is started by a bootloader BL). In step S3 a first control command A1' is transmitted to cryptography module 300 which characterizes a first computer program PRG1 to be checked by cryptography module 300, for example which describes the address area in memory device 200, 200*a* that is associated with the first computer program. Computing device 100 then directly executes first computer program PRG1 (see step S3*a*), in particular without waiting for a result of the check of first computer program PRG1 by cryptography module 300. First computer program PRG1 thus becomes active in the computing device (see block PRG1 from FIG. 7).

After cryptography module 300 receives first control command A1' (see step S4), cryptography module 300 checks first computer program PRG1 in step S5. The check in step S5 includes, for example, the formation of a CMAC value as a function of first computer program PRG1 or of a corresponding memory content of memory device 200, 200*a* that stores first computer program PRG1, and a comparison to a reference CMAC value R. The information concerning which memory area is to be checked, and which reference value (CMAC, for example) R is to be used for this purpose, may be taken by cryptography module 300 from, for example, reference data stored in memory unit 302 (and/or from first control command A1'). Cryptography module 300 stores the result of the check from step S5, preferably internally (in particular in a memory 302 or memory area to which no other unit may make read access or write access) in step S6, and a corresponding response A2' is transmitted to computing device 100 in step S7. Alternatively, the result of the check from step S5 may also be (optionally additionally) stored in result memory unit 306 in step S6, where it may be read by computing device 100. In further specific embodiments it is also possible for the cryptography module to transmit an interrupt request A2' to the computing device as soon as check S5 has concluded.

As already stated above with reference to FIG. 3, in further preferred specific embodiments, it is provided that cryptography module 300 includes a memory unit 302, which is preferably integrated into cryptography module 300, for storing at least one reference value R and/or a reference layout for the at least one memory area or the at least one computer program PRG1 to be checked. In further preferred specific embodiments, reference value R may represent, for example, a CMAC value for computer program PRG1 or a predefinable memory content that may be compared, for example, to a CMAC value that has been ascertained by the cryptography module when checking the at least one first computer program or memory area. If the ascertained CMAC value differs from reference value R, an inadmissible change in the memory content of the checked memory area may be deduced.

In further preferred specific embodiments, it is provided that cryptography module 300 is designed to carry out the check as a function of reference value R. In these specific embodiments, the check includes, for example, the formation of a CMAC value as a function of first computer program PRG1 or of the memory content of the at least one memory area, and a comparison of the CMAC value thus formed to reference value R (FIG. 4), which is stored, for example, in memory unit 302 of cryptography module 300. Alternatively or additionally, in further preferred specific embodiments, reference value R may also be transmitted to cryptography module 300 by computing device 100, 100*a* with the aid of first control command A1. Also alternatively or additionally, in further specific embodiments it is also possible to transmit to cryptography module 300 multiple reference values R for multiple memory areas or computer programs PRG1, BL, . . . to be checked, with the aid of first control command A1.

In further preferred specific embodiments, a reference layout may contain one or multiple of the following pieces of information: a) the number of computer programs or memory areas in the memory device which the computing device may access, b) an address area (start address and/or end address) of the computer programs or memory areas in question, c) the length of the computer programs or memory areas in question, d) at least one reference value (a CMAC value, for example) of the computer program or memory area in question, e) data concerning a cryptographic signature, for example a signature address and/or a signature type and/or a reference to a higher-order certificate ("root certificate"). The information may preferably be stored in a data structure DS that includes multiple corresponding data fields (see FIG. 8, for example in memory unit 302 (FIG. 3)).

In further preferred specific embodiments, cryptography module 300 may utilize the above-mentioned reference values or the reference layout to establish the type and the extent of a check of at least one computer program PRG1 or memory area. For example, the quantity of input data for the check (CMAC value formation, for example) may be established based on a start address and an end address.

In further particularly preferred specific embodiments, it is provided that computing device 100, 100*a* is designed to execute 410 first computer program PRG1 directly after transmitting 400

(FIG. 5) first control command A1 to cryptography module 300, in particular without waiting for a or the response by cryptography module 300 to first control command A1 and/or without reading out 420 the response from cryptography module 300. In these specific embodiments, first computer program PRG1 is thus already executed by computing device 100, 100a (see block PRG1 from FIG. 7), even before a check of first computer program PRG1 by cryptography module 300 has concluded, or the result of the check of first computer program PRG1 by cryptography module 300 is read out by computing device 100, 100a (for example, in the form of response A2, A2' to the first control command). A particularly quick execution of first computer program PRG1 by computing device 100, 100a is thus ensured, and at the same time, the check of first computer program PRG1 by cryptography module 300 has already been initiated with the aid of the first control command.

In further preferred specific embodiments, it is provided that computing device 100, 100a is designed to wait for a or the response A2 by cryptography module 300 to first control command A1 and/or to read out response A2 from cryptography module 300, and to execute first computer program PRG1 only after the response is received or read out. A particularly reliable execution of first computer program PRG1, which takes place only after the check by cryptography module 300, is thus made possible.

In further preferred specific embodiments, as mentioned above, it is provided that computing device 100, 100a is designed to control an operation of computing device 100, 100a as a function of response A2. Thus, for example, in the event of a negative result of the check of first computer program PRG1 by cryptography module 300 (the first computer program has been changed, for example due to an error in memory device 200, 200a, or manipulated by an attacker, for example), an error response is initiated by computing device 100, 100a and/or cryptography module 300. The error response may provide at least one of the following measures, for example: abortion of the execution of first computer program PRG1 by computing device 100, 100a (if possible), prevention of a repeated or new execution of first computer program PRG1 by computing device 100, 100a, signaling of an error state to an external unit, resetting computing device 100, 100a (in particular by cryptography module 300), temporary or permanent deactivation of computing device 100, 100a, deletion of first computer program PRG1 from memory device 200, 200a.

Figure 8:
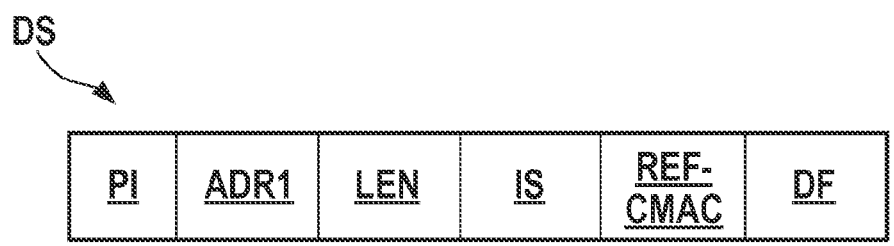
FIG. 8 schematically shows a data structure according to one specific embodiment of the present invention.

The features according to the specific embodiments have the following stated advantages, among others: a) manipulations (as well as error-related changes) of the content of memory device 200, 200a, for example manipulations of computer programs PRG1, BL stored therein, may be efficiently detected during runtime of computing device 100, 100a and of cryptography module 300 (runtime manipulation detection (RTMD)), b) secure booting (i.e., startup) of software PRG1 on computing device 100, for example application software, is ensured ("trusted boot"), c) computer programs PRG1 or other data that are subsequently stored in memory device 200, 200a may advantageously also be subsequently checked according to the principle according to the specific embodiments ("secure flashing"), d) access to cryptographic keys and other sensitive information optionally provided by the cryptography module is controllable as a function of the check according to the specific embodiments ("security access"), e) a boot sequence (sequence of the execution of computer programs upon starting computing unit 100) may be arbitrarily selected without adversely affecting security, f) by the use of cryptography module 300, optionally including a dedicated hardware circuit, powerful and secure cryptographic functions may be provided, for example CMAC formation, for example based on the 128-bit Advanced Encryption Standard (AES), g) due to providing reference layouts, for example in the form of data structure DS according to FIG. 8, the operation of cryptography module 300 may be flexibly adapted to different memory layouts and other configurations of computing device 100, 100a, h) due to the transmission of first control command A1, programs PRG1 or memory areas to be checked may be dynamically signaled to cryptography module 300 (for example, during runtime of the cryptography module), i) the immediate execution 410 (FIG. 5) of first computer program PRG1 even before the check by cryptography module 300 is (completely) carried out results in a particularly short start time for computer program PRG1.

What is claimed is:

1. A computing device, comprising:
at least one processor core configured to execute a first computer program;
wherein the computing device is configured to access a memory device in order to load the first computer program, the computing device being configured to transmit a first control command, which includes an address of the first computer program and a length of the first computer program, to at least one cryptography module, the cryptography module being configured to check the first computer program, characterized by the first control command, and the computing device being configured to execute the first computer program;
wherein the computing device is configured to execute the first computer program directly after transmitting the first control command to the cryptography module without waiting for a response of the cryptography module to the first control command and without reading out the response from the cryptography module;
wherein the first control command includes a cipher-based message authentication code (CMAC) value for the first computer program, and wherein the cryptography module checks the first computer program using the CMAC value in the first control command.

2. The computing device as recited in claim 1, wherein the computing device is configured to receive a response of the cryptography module to the first control command or to read out the response from the cryptography module, the response including information concerning a result of the check of the first computer program or of the memory area of the memory device associated with the first computer program, characterized by the control command.

3. The computing device as recited in claim 2, wherein the computing device is configured to control an operation of the computing device as a function of the response.

4. The computing device as recited in claim 1, wherein a) the memory device is integrated into the computing device, and/or b) the memory device is provided externally to the computing device.

5. A method for operating a computing device that includes at least one processor core configured to execute a first computer program, the computing device being configured to access a memory device to load the first computer program, the method comprising the following steps:
transmitting, by the computing device, a first control command which includes an address of the first computer program and a length of the first computer program, to at least one cryptography module, the cryptography module being configured to check the computer program, characterized by the control command; and executing, by the computing device, the first computer program;

wherein the computing device executes the first computer program directly after transmitting the first control command to the cryptography module without waiting for a response of the cryptography module to the first control command and without reading out the response from the cryptography module;

wherein the first control command includes a cipher-based message authentication code (CMAC) value for the first computer program, and wherein the cryptography module checks the first computer program using the CMAC value in the first control command.

6. The method as recited in claim 5, further comprising:

receiving, by the computing device, a response of the cryptography module to the first control command or reading out, by the computing device, the response from the cryptography module, the response including information concerning a result of the check of the computer program or of the memory area of the memory device associated with the first computer program, characterized by the control command.

7. A system, comprising:

at least one computing device including at least one processor core configured to execute a first computer program, wherein the computing device is configured to access a memory device to load the first computer program, the computing device being configured to transmit a first control command, which includes an address of the first computer program and a length of the first computer program, to at least one cryptography module, the cryptography module being configured to check the first computer program, characterized by the first control command, and the computing device being configured to execute the first computer program, wherein the computing device is configured to execute the first computer program directly after transmitting the first control command to the cryptography module without waiting for a response of the cryptography module to the first control command and without reading out the response from the cryptography module;

the memory device; and the at least one cryptography module configured to receive from the computing device the first control command; and check the first computer program, characterized by the first control command;

wherein the memory device and the at least one cryptography module are situated on the same semiconductor substrates;

wherein the first control command includes a cipher-based message authentication code (CMAC) value for the first computer program, and wherein the cryptography module checks the first computer program using the CMAC value in the first control command.

* * * * *